United States Patent
Pettit et al.

(10) Patent No.: US 6,485,853 B1
(45) Date of Patent: Nov. 26, 2002

(54) FUEL CELL SYSTEM HAVING THERMALLY INTEGRATED, ISOTHERMAL CO-CLEANSING SUBSYSTEM

(75) Inventors: William Henry Pettit, Rochester, NY (US); Rodney Lynn Borup, Los Alamos, NM (US)

(73) Assignee: General Motors Corporation, Detroit, MI (US)

( * ) Notice: Subject to any disclaimer, the term of this patent is extended or adjusted under 35 U.S.C. 154(b) by 25 days.

(21) Appl. No.: 09/604,151

(22) Filed: Jun. 27, 2000

(51) Int. Cl.[7] ................................................ H01M 8/04
(52) U.S. Cl. ............................ 429/17; 429/13; 429/26
(58) Field of Search ................................ 429/13, 17, 26

(56) References Cited

U.S. PATENT DOCUMENTS

| | | | |
|---|---|---|---|
| 4,853,100 A | 8/1989 | Hsu | 204/256 |
| 5,187,024 A | 2/1993 | Matsumura | 429/24 |
| 5,492,570 A | 2/1996 | Horner-Richardson et al. | 136/200 |
| 5,549,153 A | 8/1996 | Baruschke et al. | 165/42 |
| 5,728,483 A | 3/1998 | Fujitani et al. | 429/12 |
| 6,299,995 B1 * | 10/2001 | Abdo et al. | 429/17 |

* cited by examiner

Primary Examiner—Carol Chaney
Assistant Examiner—Dah-Wei D. Yuan
(74) Attorney, Agent, or Firm—Cary W. Brooks

(57) ABSTRACT

A fuel cell system having a thermally integrated isothermal CO-cleansing subsystem including a water-gas-shift reactor, a preferential oxidation reactor, at least one system heat exchanger, and a closed-loop heat transfer circuit dedicated to that subsystem. The heat transfer circuit utilizes a heat transfer medium which has a high specific heat and is circulated through the circuit at a sufficiently high rate as to thermally dominate the gas stream components communicating with the circuit.

13 Claims, 2 Drawing Sheets

FUEL CELL SYSTEM HAVING THERMALLY INTEGRATED, ISOTHERMAL CO-CLEANSING SUBSYSTEM

TECHNICAL FIELD

This invention relates to a PEM fuel cell system having a substantially isothermal, thermally integrated CO-cleansing subsystem to optimize efficiency and reaction control.

BACKGROUND OF THE INVENTION

PEM fuel cells have been proposed for many applications including electrical power plants to replace internal combustion engines. PEM fuel cells are well known in the art and include a "membrane electrode assembly" (a.k.a. MEA) comprising a thin, proton transmissive, solid polymer membrane-electrolyte having an anode on one of its faces and a cathode on the opposite face. The solid polymer electrolytes are typically made from ion exchange resins such as perfluoronated sulfonic acid. The anode/cathode typically comprise finely divided catalytic particles (often supported on carbon particles) admixed with proton conductive resin. The MEA is sandwiched between a pair of electrically conductive elements which (1) serve as current collectors for the anode and cathode, and (2) contain channels for distributing the fuel cell's gaseous reactants over the surfaces of the respective anode and cathode. In PEM fuel cells, hydrogen is the anode reactant (i.e. fuel) and oxygen is the cathode reactant (i.e. oxidant).

For vehicular applications it is desirable to use a carbon-bound hydrogenous fuel (e.g. methane, gasoline, methanol, etc.). Liquid such fuels are particularly desirable as the source of the hydrogen used by the fuel cell owing to their ease of on board storage and the existence of a nationwide infrastructure of service stations that can conveniently supply such liquids. These fuels must be dissociated to release their hydrogen content for fueling the fuel cell. The dissociation reaction is accomplished in a so-called "primary reactor". One known such primary reactor for gasoline, for example, is a two stage chemical reactor often referred to as an "autothermal reformer". In an autothermal reformer, gasoline and water vapor (i.e. steam) are mixed with air and pass sequentially through two reaction sections i.e. a first "partial oxidation" (POX) section, and a second steam reforming (SR) section. In the POX section, and with or without a catalyst, the gasoline reacts exothermically with a substoichiometric amount of air to produce carbon monoxide, hydrogen and lower hydrocarbons such as methane. The hot POX reaction products, along with the steam introduced with the gasoline, pass into a SR section where the lower hydrocarbons react and a fraction of the carbon monoxide react with the steam to produce a reformate gas comprising principally hydrogen, carbon dioxide, nitrogen and carbon monoxide. The SR reaction is endothermic, but obtains its required heat either from the heat that is generated in the exothermic POX section and carried forward into the SR section by the POX section effluent, or from other parts of the fuel cell system (e.g. from a combustor). One such autothermal reformer is described in International Patent Publication Number WO 98/08771 published Mar. 5, 1998.

The carbon monoxide contained in the SR effluent must be removed, or at least reduced to very low concentrations (i.e. less than about 20 ppm) that are non-toxic to the anode catalyst in the fuel cell. It is known to cleanse the SR effluent of CO by subjecting it to a so-called "water-gas-shift" reaction (WGS) which takes place in a water-gas-shift reactor located downstream of the SR reactor. In the water-gas-shift reaction, water (i.e. steam) reacts exothermically with the carbon monoxide in the SR effluent according to the following ideal shift reaction:

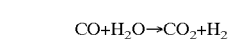

None-the-less, some CO still survives the water-gas-shift reaction and needs to be reduced further (i.e. to below about 20 ppm) before the reformate can be supplied to the fuel cell. It is known to further reduce the CO content of $H_2$-rich reformate exiting a water-gas-shift reactor by reacting it with oxygen (i.e. as air) in a so-called "PrOx" reaction (i.e. preferential oxidation) carried out in a catalytic PrOx reactor. The PrOx reaction is exothermic and proceeds as follows:

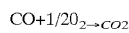

The PrOx reactor effluent (i.e. CO-cleansed, $H_2$-rich reformate) is then supplied to the fuel cell. The PrOx reaction is also known as SelOx (i.e. selective oxidation).

Typical such fuel cell systems are thermally complex having a plurality of system components and working fluids (i.e. reactant streams such as fuel, air, reformate, etc.) all operating at different temperatures. Accordingly, such systems are often complex to control and slow to start-up after they have cooled down following a shutdown. The present invention simplifies the thermal management and start-up of PEM fuel cells fueled by hydrogen derived from carbon-bound hydrogenous fuels.

SUMMARY OF THE INVENTION

The present invention contemplates a PEM fuel cell system having an independent, substantially isothermal, heat transfer subsystem that communicates, and substantially thermally dominates, selected components of the fuel cell system. The isothermal heat transfer subsystem contemplated by this invention: (1) thermally integrates PrOx and water-gas-shift reactors that are designed to operate at substantially the same temperature, as well as other system components (e.g. heat exchangers) that operate at about that same temperature; (2) facilitates start-up of the PrOx and shift reactors without concern for over-heating or damaging the reactors' catalysts; and (3) simplifies control of the reactors by imposing a reaction temperature thereon that is not appreciably affected by the heat generated by the reactions. By "thermally dominate" a component is meant a condition wherein the combination of the flow rate and the specific heat of the heat transfer medium used in the heat transfer circuit is such that the heat transfer circuit is the dominant or controlling factor effecting the operating temperature of that component.

According to a preferred embodiment, this invention involves a PEM fuel cell system that comprises a primary reactor that converts a carbon-bound hydrogenous fuel (e.g. gasoline) into a $H_2$-rich reformate gas for fueling the fuel cell. The processor has (1) a first POX section in which the gasoline is reacted with a substoichiometric amount of oxygen to form a gas stream containing lower hydrocarbons (e.g. methane) and first concentrations of CO and $H_2$, and (2) a second SR section, downstream of the first POX section, in which the gas stream exiting the POX section is catalytically reacted with steam to form a reformate gas having a second CO concentration that is less than the first CO concentration and a second $H_2$ concentration that is greater than the first $H_2$ concentration. The system also includes at least one water-gas-shift reactor downstream of the primary reactor that reacts a portion of the CO in the reformate gas exiting the primary reactor with steam to reduce the CO concentration in the fuel gas to a third CO concentration below the second CO concentration in the SR reactor effluent, and to increase the $H_2$ concentration above the second $H_2$ concentration in the SR reactor effluent. Multiple water-gas-shift reactors operating at different temperatures may be used in lieu of a single water-gas-shift reactor. Still further the system includes a PrOx reactor that selectively reacts some of the CO in the reform ate gas exiting the water-gas-shift reactor with oxygen (i.e. from air) to reduce the CO concentration in the reformate gas below the third CO concentration, and yield a CO-lean gas in which the CO concentration is non-toxic to the fuel cell.

The present invention contemplates such a PEM fuel cell system wherein: (1) the PrOx reactor is an isothermal reactor whose catalyst is selected to effect the selective oxidation of CO at a particular temperature; (2) the water-gas-shift reactor is also an isothermal reactor whose catalyst is selected to effect the water-gas-shift reaction at substantially the same temperature as the PrOx reaction occurs; (3) there is at least one heat exchanger that transfers heat either to or from at least one of the system's working fluids; (4) there is a closed-loop heat transfer circuit that communicates with the water-gas-shift reactor, the PrOx reactor, and the heat exchanger(s); (5) there is a heat transfer liquid having a relatively high specific heat that circulates in the circuit through the water-gas-shift reactor, the PrOx reactor, and the heat exchanger (s); and (6) there is a pump that circulates the heat transfer liquid at a sufficiently high rate throughout the circuit as to maintain the water-gas-shift reactor, the preferential oxidation reactor, and the heat exchanger all at substantially the operating temperature selected for the PrOx reactor. For purposes of this application, the term "substantially the operating temperature of the PrOx reactor", as used herein, means a temperature that falls within about 20° C.± degrees of the operating temperature of the PrOx reactor. Other operating temperatures may be selected to optimize the over all volume and mass of the components in the heat transfer circuit. In one embodiment of the invention, the heat exchanger is a vaporizer that serves to vaporize (1) a carbon-bound hydrogenous liquid fuel (e.g. gasoline) before it is introduced into the fuel processor, or (2) water before it is introduced into either the primary reactor or the water-gas-shift reactor. In another embodiment, the heat exchanger is a heater for preheating the oxygen before it is introduced into the fuel processor. In a further embodiment, the heat exchanger is a cooler for cooling the reformate gas before it is introduced into the water-gas-shift reactor. In still another embodiment, the heat exchanger is a by-passable cooler (e.g. a radiator) for cooling the heat transfer liquid if its temperature is substantially greater than the operating temperature of the PrOx reactor. If the temperature of the heat transfer liquid is within acceptable limits (i.e. does not require cooling), this cooler may be bypassed using appropriate plumbing. In yet another embodiment, the heat exchanger is a heater that heats (e.g. with heat from a combustor) the heat transfer liquid if its temperature is substantially less than the operating temperature of the PrOx reactor.

According to a preferred embodiment of the invention, the heat transfer circuit will contain a plurality of heat exchangers each performing one or more of the heating/cooling functions set forth above. Most preferably, the heat transfer circuit will contain all of the heat exchangers set forth above.

DETAILED DESCRIPTION OF EXAMPLES OF THE INVENTION

The invention will be better understood when considered in the light of the following detailed description of certain specific embodiments thereof which is given hereafter with reference to the drawings.

Figure 1:
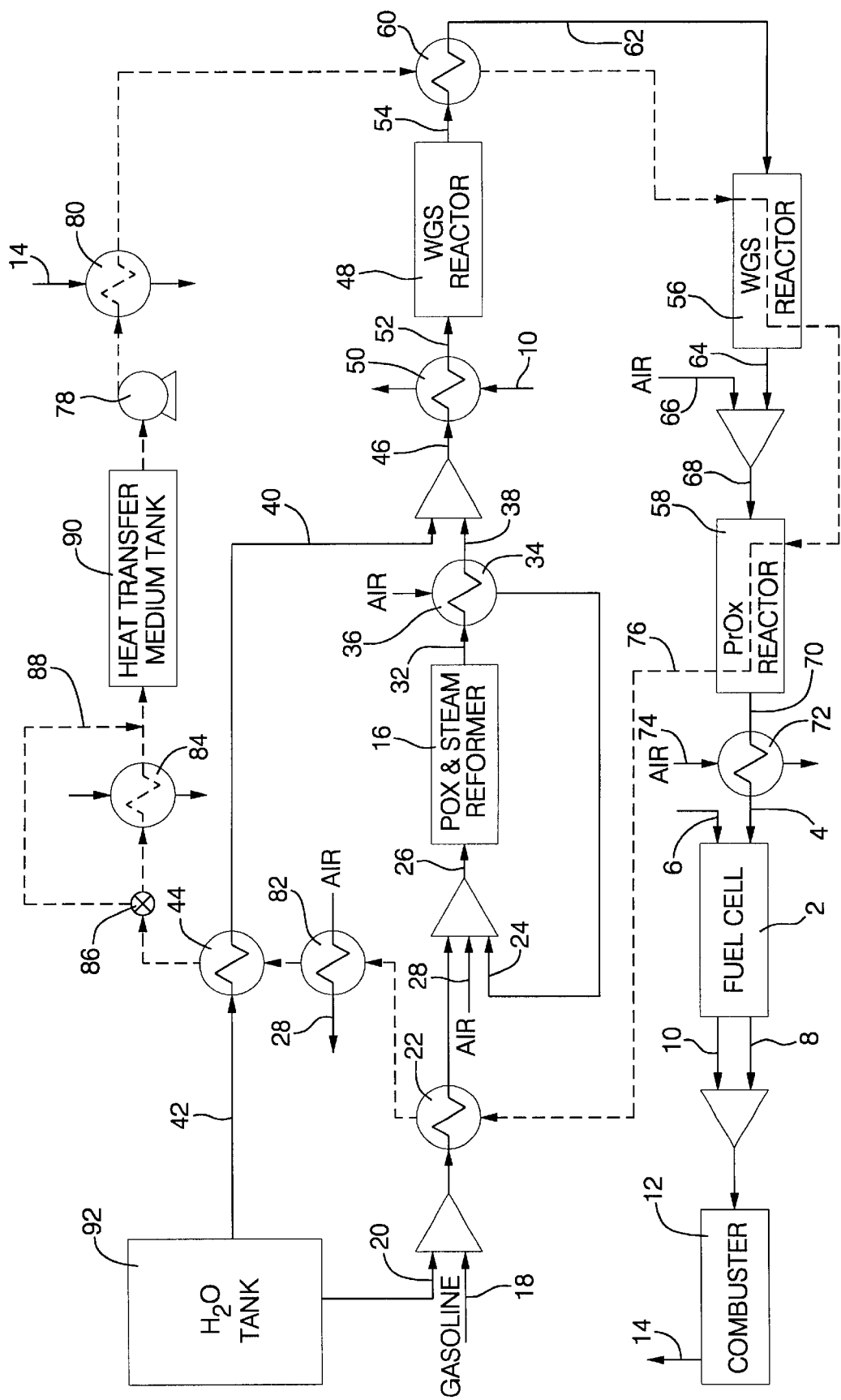
FIG. 1 is a schematic of one embodiment of a fuel cell system in accordance with the present invention.

FIG. 1 shows a PEM fuel cell 2 fueled by hydrogen in the anode inlet line 4 and air in the cathode inlet line 6. Anode exhaust gases 8 and cathode exhaust gases 10 exit the fuel cell 2 and are supplied to a combustor 12 in which they are burned to form a heated exhaust gas 14. The hydrogen in line 4 is derived from the dissociation of gasoline in an autothermal reformer 16. In this regard, gasoline 18 and water 20 are vaporized in a vaporizer 22, and thence mixed with preheated air 24 and 28 and supplied to the autothermal reformer 16 via line 26.

The autothermal reformer 16 comprises two sections including a first "partial oxidation" (i.e. POX) section and a second "steam reformer" (i.e. SR) section downstream of the POX section as discussed above. In the POX section, the gasoline reacts exothermically with a sub stoichiometric amount of air to produce carbon monoxide, hydrogen and lower hydrocarbons such as methane. The hot POX reaction products then move into the SR section of the autothermal reformer where the lower hydrocarbons and steam react to produce a reformate gas 32 comprising principally hydrogen, carbon dioxide, nitrogen and carbon monoxide. The POX reaction is exothermic and provides the heat required for the endothermic SR reaction that occurs downstream of the POX reaction. The reformate 32 exits the autothermal reactor 16 at a very high temperature (i.e. about 600° C.–800° C.) which is much higher than the fuel cell 2, and the reactors intermediate the fuel cell and the autothermal reformer, can tolerate. Accordingly, the reformate in line 32 is cooled in a first heat exchanger 34 by means of an ambient air 36 which, upon exiting the heat exchanger 34, is supplied to the inlet to the autothermal reformer via line 24. Hence, at least some of the air supplied to the autothermal reformer 16 is preheated for a more efficient operation of the autothermal reformer 16. The cooled reformate 38 exits the heat exchanger 34 at a temperature of about 645° C. and is mixed with steam from line 40.

The steam in line 40 is provided by heating water from line 42 in a heat exchanger 44 and serves to further cool the reformate 38 to a temperature of about 600° C. in line 46 preparatory to being introduced into a high temperature water-gas-shift reactor 48. Before the reformate enters the water-gas-shift reactor 48, it is further cooled in heat exchanger 50 (e.g. by means of cathode exhaust gas from line 10 flowing on the other side of heat exchanger 50). Following the heat exchanger 50 and before entering the high temperature water-gas-shift reactor 48, the reformate in line 52 will have a temperature of about 330° C. The water-gas-shift reaction takes place in the water gas-shift-reactor 48 where steam reacts slightly exothermically with the carbon monoxide in the reformate so as to reduce the carbon monoxide content and increase the hydrogen and carbon dioxide content, thereof. Hence, the reformate in line 54 exiting the high temperature water-gas-shift reactor 48 will still have a temperature around 420° C., and will have a lower carbon monoxide content and higher hydrogen content than the reformate in line 52 entering the water gas shift reactor 48. The carbon monoxide content of the reformate 54 at this stage will generally comprise about 2% to 4% which is still too high to be used in the fuel cell 2. Accordingly, a low temperature water gas shift reactor 56 is positioned downstream of the high temperature water-gas-shift reactor 48 to further reduce the carbon monoxide content of the reformate before it enters the PrOx reactor 58. The catalyst used in the low temperature water gas shift reactor 56 is intolerant of excessive temperatures, and particularly intolerant of 420° C. reformate 54 exiting the high temperature water-gas-shift reactor 48. Accordingly, the reformate 54 is cooled to a temperature suitable to the catalyst in the low temperature water-gas-shift reactor 56 (i.e. about 220° C.). To this end, the reformate exiting the high temperature water-gas-shift reactor 48 is passed through a heat exchanger 60 to drop its temperature down to about 220° C. in line 62 which is compatible with the operating temperature of the catalyst in the low temperature water-gas-shift reactor 56. The composition of the catalyst used in the low temperature water-gas-shift reactor 56 is selected so as to have an operating temperature range which is substantially the same as the temperature in the PrOx reactor 58. Hence, for example, when the PrOx reactor has an iridium catalyst that operates at a temperature of about 220° C., the low temperature water-gas-shift reactor 56 will have a copper-zinc catalyst that operates at substantially this same temperature, as is well known in the art. The reformate in line 62 enters the low temperature water-gas-shift reactor 56 and exits it in line 64 having a carbon monoxide content of less than about one percent (1%). The reformate in line 64 is mixed with air in line 66 and supplied to the PrOx reactor 58, via line 68. In the PrOx reactor 58, the carbon monoxide in the reformate from line 68 is preferentially exothermically oxidized with oxygen from the air to form $CO_2$ and reduce the carbon monoxide level down to levels that are nontoxic to the fuel cell 2 (i.e. below about 20 ppm). The reformate exiting the PrOx reactor 58 via line 70 is too hot for use in the fuel cell 2, and accordingly, is cooled in heat exchanger 72 using a suitable coolant 74 adapted to reduce the temperature of the reformate in line 4 down to about 80° C.

In accordance with the present invention, there is provided an independent heat transfer circuit that communicates the low temperature water gas shift reactor 56, the PrOx reactor 58 and one or more of the heat exchangers 22, 44, 60 and others that will be discussed hereinafter. This heat transfer circuit is shown in dotted line 76, and comprises suitable plumbing for moving a suitable heat transfer medium through the several reactors and heat exchangers. Preferably the heat transfer medium will have a high specific heat (i.e. at least about 2 KJ/Kg·K) such that its temperature is not easily changed when heat is added to or removed from the medium. A preferred heat transfer medium for this application comprises a parafinic hydrocarbon oil such as is commercially available under the name Paratherm® from the Paratherm Company. In accordance with the present invention, the heat transfer medium will be circulated through the circuit 76 by a pump 78 at such a rate as to thermally dominate and control the several reactors and heat exchangers and impose a temperature on each that is substantially the same as the temperature in the PrOx reactor 58 (e.g. about 220° C.) in this embodiment.

As shown in FIG. 1, pump 78 circulates the heat transfer medium through the circuit 76, and in so doing, first encounters the heat exchanger 80 which, if needed, is used to heat the heat exchange medium using exhaust gases in line 14 from the combustor 12. When the temperature of the heat transfer medium is at a suitable level and no heating is required, the combustor exhaust in line 14 is diverted to elsewhere in the system or to the ambient as the situation dictates. Next, the heat transfer medium flows from the heater 80 to the heat exchanger 60 which serves to cool the reformate in line 54 exiting the high temperature water gas shift reactor 48 and entering the low temperature water gas shift reactor 56. Thereafter, the heat transfer medium flows through the water gas shift reactor at a sufficient rate as to maintain the temperature of the water gas shift reactor throughout at about the temperature of the heat transfer medium in the circuit 76. That temperature is about the same as the operating temperature in the PrOx reactor 58 through which the heat transfer medium next flows. Hence the flowing heat transfer medium establishes and maintains the operating temperature of the PrOx reactor 58 and the water-gas-shift reactor thereby eliminating any complicated controls that might otherwise be required to control the irrespective temperatures. Next, the heat transfer medium flows through heat exchanger 22 which is functionally a vaporizer for vaporizing the gasoline and water supplied thereto via lines 18 and 20, respectively. The vaporizer 22 vaporizes the gasoline and water preparatory to its entry into the autothermal reformer 16. After exiting the vaporizer 22, the heat transfer medium enters the heat exchanger 82 which serves to preheat air in line 28 preparatory to its entrance into the autothermal reactor 16. The heat transfer fluid next exits the heat exchanger 82 and enters the heat exchanger 44 which, like the heat exchanger 22, is functionally a vaporizer for vaporizing the water in line 42 and supplying it as steam in line 40 to the input of the high temperature water gas shift reactor 48. The heat transfer liquid will next optionally, flow through the heat exchanger 84 which is a radiator, or the like, for cooling the heat transfer liquid in the circuit 76 should it get too hot. If cooling is not required, a valve 86 is energized to allow the heat transfer liquid to bypass the radiator 84 via bypass line 88. Finally, the heat transfer liquid returns to a heat transfer liquid storage tank 90 from whence it started. The heat transfer liquid storage tank 90 will preferably be insulated so as to maintain the temperature of the heat transfer liquid for a long period of time after the fuel cell is shut down. In this regard, the storage tank 90 will have sufficient capacity to hold a relatively large volume of the heat transfer liquid so that, upon start up of the fuel cell, warm/hot heat transfer medium is instantly available for circulating through the system, and quickly heating it up to operating temperature. Alternatively, or by way of supplement, the heat transfer medium may be heated in the heat exchanger 80 during start up. Initially, this may require firing the combustor 12 with gasoline supplied directly from the gasoline fuel tank rather than relying on cathode and anode exhaust to fire the combustor. Water for the system is stored in a water storage tank 92 which, like the heat transfer liquid storage tank 90, may be insulated to retain heat therein during shutdown of the fuel cell system.

Figure 2:
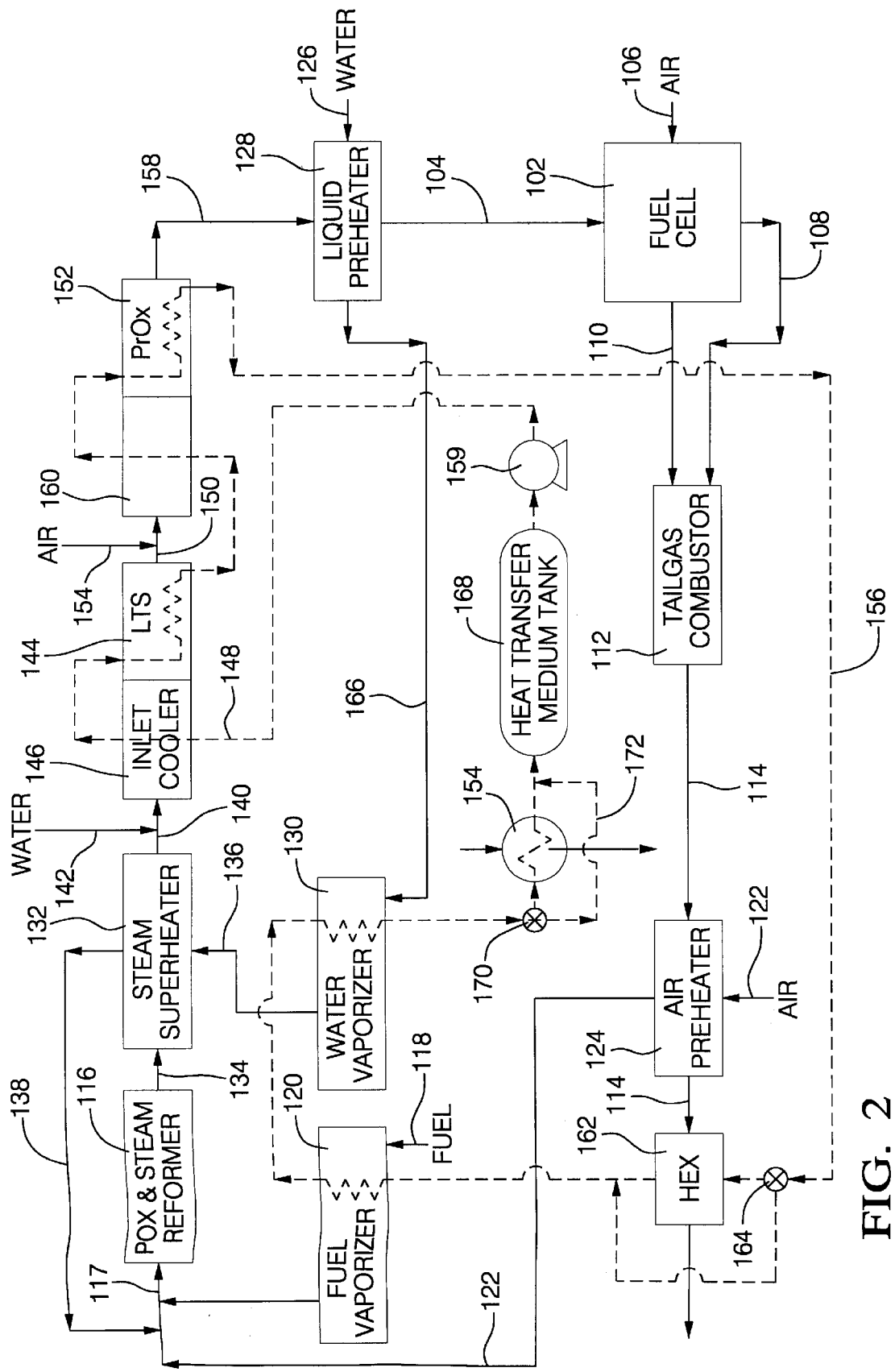
FIG. 2 is a schematic of another embodiment of a fuel cell system in accordance with the present invention.

In FIG. 2 there is shown a PEM fuel cell 102 fueled by hydrogen in the anode inlet line 104 and air in the cathode inlet line 106. Anode exhaust gases 108 and cathode exhaust gases 110 exit the fuel cell 102 and are supplied to a combustor 112 wherein they are burned to form a heated exhaust gas 114. The hydrogen in line 104 is derived from the dissociation of gasoline in an autothermal reformer 116. In this regard, gasoline 118 is vaporized in a vaporizer 120, and thence mixed with air 122 preheated via air preheater 124 heated by combuster exhaust gas 114, and with water 126 which may or may not be preheated in a liquid preheater 128, then vaporized in vaporizer 130 and finally superheated in heat exchanger 132 heated by the exhaust gas 134 from the autothermal reformer 116. The mixture is supplied to the autothermal reformer 116 via line 117.

The autothermal reformer 116 comprises two sections including a first "partial oxidation" (i.e. POX) section and a second "steam reformer" (i.e. SR) section downstream of the POX section. In the POX section, the gasoline reacts exothermically with a substoichiometric amount of air to produce carbon monoxide, hydrogen and lower hydrocarbons such as methane. The hot POX reaction products then move into the SR section of the autothermal reformer 116 where they react with steam to produce a reformate gas 134 comprising principally hydrogen, carbon dioxide, nitrogen and carbon monoxide. The POX reaction is exothermic and provides the heat required by the endothermic SR reaction that occurs downstream of the POX reaction.

The reformate 134 exits the autothermal reformer 116 at a very high temperature (i.e. about 750° C.) which is much higher than the fuel cell 102, and the reactors intermediate the fuel cell and the autothermal reformer can tolerate. Accordingly, the reformate in line 134 is cooled in a first heat exchanger 132 by means of steam 136 which, upon exiting the heat exchanger 132, is supplied to the inlet to the autothermal reformer 116 via line 138. The air 122 for the autothermal reformer 116 is preheated in preheater 124 using exhaust gas 114 from combuster 112. Hence, the air stream supplied to the autothermal reformer 116 is preheated for a more efficient operation of the autothermal reformer 116. The cooled reformate 140 exits the heat exchanger 132 at a temperature of about 500° C. and is mixed with steam or water spray from line 142, if desired. The steam or liquid water in line 142 serves to further cool the reformate 140, if desired. Before the reformate enters a low temperature water-gas-shift reactor 144, it is further cooled in heat exchanger 146 by means of the heat transfer medium from line 148 flowing on the other side of heat exchanger 146. Following the heat exchanger 146 and before entering the low temperature water-gas-shift reactor 144, the reformate will have a temperature of about 220° C. The water-gas-shift reaction takes place in the water-gas-shift reactor 144 where steam reacts slightly exothermically with the carbon monoxide in the reformate so as to reduce the carbon monoxide content and increase the hydrogen and carbon dioxide content, thereof. Hence, the reformate in line 150 exiting the low temperature water-gas-shift reactor 144 will still have a temperature around 220° C., but will have a lower carbon monoxide content and higher hydrogen content than the reformate in line 140 entering the water gas shift reactor 144.

The composition of the catalyst used in the low temperature water-gas-shift reactor 144 is selected so as to have an operating temperature range which is substantially the same as the temperature in the PrOx reactor 152. Hence, when the PrOx reactor has a catalyst comprising Iridium and operates at a temperature of about 220° C., the catalyst in the low temperature water-gas-shift reactor 144 will comprise copper-zinc. The reformate in line 140 enters the low temperature water-gas-shift reactor 144 and exits it in line 150 having a carbon monoxide content of less than about 1% (by volume). The reformate in line 150 is mixed with air in line 154, and supplied to the PrOx reactor 152. In the PrOx reactor 152, the carbon monoxide in the reformate from line 150 is preferentially exothermically oxidized with oxygen from the air to form $CO_2$, and reduce the carbon monoxide level down to levels that are nontoxic to the fuel cell 2 (i.e. below about 20 ppm). The reformate exiting the PrOx reactor 152 via line 158 is too hot for use in the fuel cell 102, and accordingly, is cooled in heat exchanger 128 using a suitable coolant 126 adapted to reduce the temperature of the reformate in line 104 down to about 80° C.

In accordance with the present invention, there is provided an independent heat transfer circuit that communicates the low temperature water gas shift reactor 144, the PrOx reactor 152 and one or more of the heat exchangers 146, 160, 162, 120, 130, 154 and others. This heat transfer circuit is shown in dotted line 156, and comprises suitable plumbing for moving a suitable heat transfer medium through the several reactors and heat exchangers. Preferably the heat transfer medium will have a high specific heat (i.e. at least about 2 KJ/Kg·K) such that its temperature is not easily changed when heat is added to or removed from the medium. A preferred heat transfer medium for this application comprises a parafinic hydrocarbon oil such as is commercially available under the name Paratherm from the Paratherm Company. In accordance with the present invention, the heat transfer medium will be circulated through the circuit 156 by a pump 159 at such a rate as to thermally dominate the several reactors and heat exchangers and impose a temperature on each that is substantially the same as the temperature in the PrOx reactor 152 (e.g. about 220° C.) in this embodiment.

As shown in FIG. 2, pump 159 circulates the heat transfer medium through the circuit 156. The heat exchanger 162, if needed, is used to heat the heat exchange medium using output gases in line 114 from the air preheater 124. When the temperature of the heat transfer medium is at a suitable level and no further heating is required, the heat transfer medium is diverted, via valve 164, around the heat exchanger 162. Next, the heat transfer medium flows from the heater 162 to the heat exchanger 120 which is functionally a vaporizer for vaporizing the gasoline supplied thereto via line 118. Next the heat transfer medium flows to heat exchanger 130 which is functionally a vaporizer for vaporizing the water supplied thereto via line 166. The heat transfer medium then passes through a cooler/heat exchanger 154 which has the capability to remove heat if needed using the coolant that circulates through the fuel cell 102. If cooling is not required, a valve 170 is energized to allow the heat transfer medium to bypass the radiator 154 via bypass line 172. The heat transfer medium storage tank 168 will preferably be insulated so as to maintain the temperature of the heat transfer liquid for a long period of time after the fuel cell is shut down. In this regard, the storage tank 168 will have sufficient capacity to hold a portion of the heat transfer medium so that, upon start up of the fuel cell, warm/hot heat transfer medium is instantly available for circulating through the system and quickly heating it up to operating temperature. The tank 168 has internal valving that allows it to drain back or fill once the vehicle in shut off and then pump out during normal operation of the system with the majority of the volume not being part of the circuit 156. Alternatively, or by way of supplement, the heat transfer medium may be heated in the heat exchanger 162 during start up. Initially, this may require firing the combustor 112 with gasoline supplied directly from the gasoline fuel tank rather than relying on cathode and anode exhaust to fire the combustor. Water for the system is stored in a water storage tank (not shown) which, like the heat transfer liquid storage tank 168, may be insulated to retain heat therein during shutdown of the fuel cell system. The heat transfer medium then passes through an expansion reservoir (i.e. storage tank) 168 and into the pump 159. Next the heat transfer medium flow from the pump 159 to heat exchanger 146 which serves to cool the reformate in line 140 entering the low temperature water-gas-shift reactor 144. Thereafter, the heat transfer medium flows through the water-gas-shift reactor at a sufficient rate as to maintain the temperature of the water-gas-shift reactor throughout at about the temperature of the heat transfer medium in the circuit 156. The temperature is about the same as the operating temperature in the PrOx reactor 152 through which the heat transfer medium flows after passing through the heat exchanger 160. Hence the flowing heat transfer medium establishes and maintains the operating temperature of the PrOx reactor 152 and the water-gas-shift reactor 144 thereby eliminating any complicated controls that might otherwise be required to control their respective temperatures. The heat transfer medium then returns to heat exchanger 162 completing the loop.

While the invention has been disclosed primarily in terms of the specific embodiment thereof, it is not intended to be limited thereto but rather only to the extent set forth hereafter in the claims, which follow.

What is claimed is:

1. In a PEM fuel cell system comprising (i) a primary reactor for converting a carbon-bound hydrogenous fuel into a fuel gas including $H_2$ for said fuel cell, said primary reactor comprising a catalyst for catalytically reacting said fuel with steam to form said fuel gas having a first CO concentration and a first $H_2$ concentration, (ii) at least one water-gas-shift reactor for reacting at least a portion of the CO in said fuel gas exiting said catalyst with steam to reduce the CO concentration in said fuel gas to a second CO concentration below said first CO concentration and increase the $H_2$ concentration above said first $H_2$ concentration in said fuel gas, and (iii) a preferential oxidation reactor for selectively reacting at least a portion of the CO in said fuel gas exiting said water-gas-shift reactor with oxygen to reduce the CO concentration in said fuel gas below said second CO concentration and to yield a fuel gas including CO in an amount that is non-toxic to said fuel cell, the improvement comprising:

a. said preferential oxidation reactor being an isothermal reactor having a first catalyst selected to effect said selective oxidation of said CO at a first temperature,
   b. said water-gas-shift reactor being an isothermal reactor having a second catalyst selected to effect the water-gas-shift reaction therein at substantially said first temperature;
   c. at least one heat exchanger;
   d. a closed-loop heat transfer circuit communicating with said water-gas-shift reactor, said preferential oxidation reactor, and a heat exchanger,
   e. a heat transfer liquid circulating in said circuit through said water-gas-shift reactor, said preferential oxidation reactor, and a heat exchanger, and
   f. a pump adapted to circulate said heat transfer liquid at a rate throughout said circuit as to maintain said water-gas-shift reactor, said preferential oxidation reactor, and said heat exchanger all at substantially said first temperature.

2. In a PEM fuel cell system comprising (i) a primary reactor for converting gasoline into a fuel gas including $H_2$ for said fuel cell, said primary reactor having a first section for partially oxidizing said gasoline with a substoichiometric amount of oxygen to form a lower-hydrocarbon-containing gas stream having first concentrations of CO and $H_2$, and a second section downstream of said first section for catalytically reacting said gas stream with steam to form said fuel gas having a second CO concentration less than said first CO concentration and a second $H_2$ concentration greater than said second $H_2$ concentration, (ii) at least one water-gas-shift reactor for reacting at least a portion of the Co in said fuel gas exiting said second section with steam to reduce the CO concentration in said fuel gas to a third CO concentration below said second CO concentration and increase the $H_2$ concentration above said second $H_2$ concentration in said fuel gas, and (iii) a preferential oxidation reactor for selectively reacting at least a portion of the CO in said fuel gas exiting said water-gas-shift reactor with oxygen to reduce the CO concentration in said fuel gas below said third CO concentration and to yield a fuel gas including CO in an amount that is non-toxic to said fuel cell, the improvement comprising:

a. said preferential oxidation reactor being an isothermal reactor having a first catalyst selected to effect said selective oxidation of said CO at a first temperature;
   b. said water-gas-shift reactor being an isothermal reactor having a second catalyst selected to effect the water-gas-shift reaction therein at substantially said first temperature;
   c. at least one heat exchanger;
   d. a closed-loop heat transfer circuit communicating with said water-gas-shift reactor, said preferential oxidation reactor, and a heat exchanger,
   e. a heat transfer liquid circulating in said circuit through said water-gas-shift reactor, said preferential oxidation reactor, and a heat exchanger; and
   f. a pump adapted to circulate said heat transfer liquid at a rate throughout said circuit as to maintain said water-gas-shift reactor, said preferential oxidation reactor, and said heat exchanger all at substantially said first temperature.

3. A fuel cell system according to claim 2 wherein a heat exchanger is a vaporizer for vaporizing said gasoline before its introduction into said fuel processor.

4. A fuel cell system according to claim 2 wherein a heat exchanger is a vaporizer for vaporizing said water to form steam before its introduction into said fuel processor.

5. A fuel cell system according to claim 2 wherein a heat exchanger is a vaporizer for vaporizing said water to form steam before its introduction into said water-gas-shift reactor.

6. A fuel cell system according to claim 2 wherein a heat exchanger is a preheater for heating said oxygen before the introduction of the oxygen into said fuel processor.

7. A fuel cell system according to claim 2 wherein a heat exchanger is a cooler for cooling said fuel gas before its introduction into said water-gas-shift reactor.

8. A fuel cell system according to claim 2 wherein a heat exchanger is a cooler for cooling said heat transfer liquid if its temperature is greater than substantially said first temperature.

9. A fuel cell system according to claim 8 including a bypass around said cooler.

10. A fuel cell system according to claim 2 wherein a heat exchanger is a heater for heating said heat transfer liquid if its temperature is less than substantially said first temperature and requires heating.

11. A fuel cell according to claim 2 wherein said heat transfer liquid comprises a hydrocarbon having a specific heat of at least about 2 KJ/Kg·K.

12. A fuel cell according to claim 11 wherein said hydrocarbon is a paraffin oil.

13. A fuel cell system according to claim 2 comprising a plurality of said heat exchangers including a vaporizer for vaporizing said gasoline before its introduction into said fuel processor, a vaporizer for vaporizing said water to form steam before its introduction into said fuel processor, a vaporizer for vaporizing said water to form steam before its introduction into said water-gas -shift reactor, a preheater for heating said oxygen before the introduction of the oxygen into said fuel processor, a cooler for cooling said fuel gas before the introduction of the fuel gas into said water-gas-shift reactor, a cooler for cooling heat transfer liquid if its temperature is greater than substantially said first temperature, and a heater for heating said heat transfer liquid if its temperature is less than substantially said first temperature.

* * * * *